United States Patent
Cacas

(10) Patent No.: US 8,353,546 B1
(45) Date of Patent: Jan. 15, 2013

(54) APPARATUS FOR OPENING DOORS

(76) Inventor: Clay T. Cacas, Terrell, TX (US)

( * ) Notice: Subject to any disclaimer, the term of this patent is extended or adjusted under 35 U.S.C. 154(b) by 0 days.

(21) Appl. No.: 13/373,372

(22) Filed: Nov. 14, 2011

(51) Int. Cl.
  *B25J 1/04* (2006.01)
(52) U.S. Cl. .............................. 294/24; 294/175; 16/413
(58) Field of Classification Search ............... 294/10, 294/23, 24, 175, 191, 209; 81/125.1; 16/413, 16/426
See application file for complete search history.

(56) References Cited

U.S. PATENT DOCUMENTS

| | | | | |
|---|---|---|---|---|
| 3,760,656 A | * | 9/1973 | Veach | 81/15.9 |
| 4,622,868 A | * | 11/1986 | Flannigan | 81/15.9 |
| 5,231,733 A | * | 8/1993 | Dittman | 16/412 |
| 5,314,221 A | * | 5/1994 | Hammer | 294/209 |
| 5,540,468 A | * | 7/1996 | Fassman | 294/219 |
| 5,553,905 A | * | 9/1996 | Bentivegna | 294/24 |
| 5,638,576 A | * | 6/1997 | Mutone | 16/413 |
| 6,070,924 A | * | 6/2000 | Sweetman | 294/24 |
| 6,095,580 A | * | 8/2000 | Crocker | 294/175 |
| 7,938,464 B1 | * | 5/2011 | Hielm | 294/175 |

* cited by examiner

*Primary Examiner* — Dean Kramer

(57) ABSTRACT

A device for assisting a disabled person to open and close and to lock or unlock doors. The device includes a coated metal hook equipped with a silicon strip attached to a rod with a lock opener attached to the opposite end from the hook. The person using the device can open doors by placing the hook over the door knob and rotating the rod and pulls or pushes to open the door from a preferred distance.

2 Claims, 1 Drawing Sheet

Top View

Side View

Top View    Side view

APPARATUS FOR OPENING DOORS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

FIELD OF INVENTION

This invention relates generally to an assisted living device, and more particularly, to an assisted living device to open and close and to lock or unlock a door.

BACKGROUND OF INVENTION

There exists several devices that can grab or reach items with limited ability, these devices can not provide the force needed to turn a door knob and open a door.

It is very difficult for a person seated in a wheelchair or other ambulatory device to open doors. The person must open the door while inside the swing path of the door, then move the wheelchair beyond the swing path while holding the door open, and then pass through the door. Closing the door is more difficult.

There exists a need for a novel device having new features and a method whereby a door could be opened or closed, with less difficulty.

BRIEF SUMMARY OF THE INVENTION

The present invention provides an apparatus for opening doors which advantageously allows for a device to assist persons in a wheelchair or other form of handicap devices to unlock or lock, and to open or close doors. The present invention is made up of the following elements.
1. A coated metal hook that is used to be placed over the door knob.
2. A length of material that the hook attaches to.
3. A length of silicone rubber that attaches to the hook.
4. A device used for locking or unlocking the door.

The invention consists of a rod that has a hook attached at one end, attached to the hook is a strip of silicone. The opposite end of the rod has rod a device use for Locking or unlocking the door or dead bolt. The above described apparatus enables the occupant of a wheelchair to open and close doors from a distance that allows the door to open without obstructed by the wheelchair. An object of the present invention is to provide an improved method and an device that satisfies the above mentioned need.

It is another object of the present invention to provide a novel device that will be affordable and can be attached to a wheelchair or easily carried. These and other features will be in part apparent, and in part pointed out hereinafter.

A better under standing of the objects, advantages, feature, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

Embodiments of the present invention are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
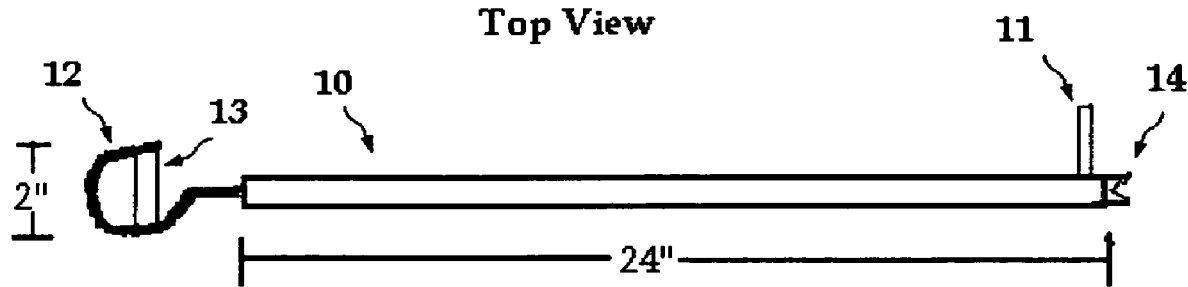
FIG. 1 Top view of present invention shown with preferred embodiment.
Figure 2:
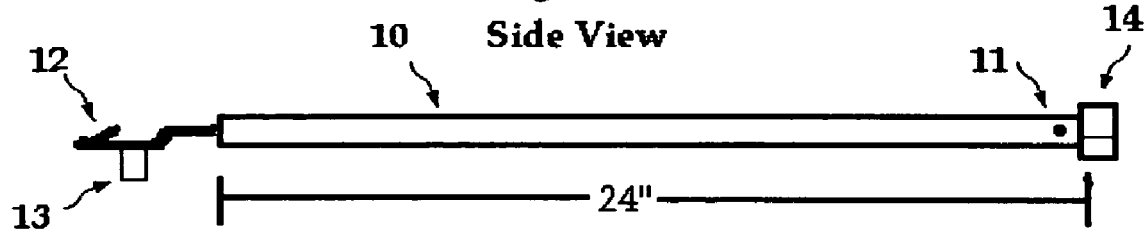
FIG. 2 Side view of present invention shown with preferred embodiment.
Figure 3:
FIG. 3 Top and side views of lock opener.
Figure 3:

While specific embodiments of the invention have been described in detail, it will be known by those skilled in the art that various modifications and alternatives to those details could be developed in the light of the overall teachings of the disclosure. Accordingly, the particular arrangements disclosed are meant to be illustrative only and not limiting as to the scope of the invention. A device for opening doors and for turning door knobs according to the principles of this invention is indicated generally in the figures. Referring to FIG. 1 the Apparatus is constructed by attaching a 24 in. wooden square rod (10) to a metal hook (12) then attaching a silicone strip (13) to the hook. The Hook (12) is at a 30 degree downward angle to the shaft. The opposite end of the rod has the locking and unlocking device (14) attached. The device (14) consist of metal track, the parallel sides are cut and one side of the cut has the parallel sides pushed closer together and the other side of the cut has the parallel sides pushed wider apart, the track is attached to the rod (10). A 3" rod (11) placed through rod (10). The device is used by placing the hook around the door knob where it is attached to the door, and then rotate the rod (10) and pull to open the door. The force needed to rotate the knob is achieved in part by the square shape of the rod (10) and the friction of the silicone strip (13) and the torque created by the 3" rod (11). The door can be locked or unlocked by placing the device (14) on the lock and rotating the rod (10).

The preceding description is for the preferred embodiment of the present invention it is understood that many variations exist, accordingly the sprit and scope of the invention are not to be limited by the above description. An example would be the apparatus could be fabricated out of plastic. And the metal hook can be coated with a silicone adhesive or a rubber type coating. The hook could be replaced by a loop or a cone that has been coated with silicone or a similar type material that prevents the doorknob from slipping.

The invention claimed is:

1. A device for turning a knob, opening, closing, locking, and unlocking a door comprising:
   a) an elongated handle having a first and a second end;
   b) a generally j-shaped rigid knob turning member, coated with a material having a high coefficient of friction at the first end of said elongated handle extending at approximately a 30 degree angle away from a longitudinal line extending through said elongated handle, having the shortest side of said j-shaped member having approximately a 30 degree angle from the parallel side of the shortest side of said member toward said longitudinal line, having additional bends that result in said longitudinal line to be generally centered with the face of the door knob when engaged with said knob;

c) a lock turning member at the second end of said elongated handle, with said lock turning member configured for engagement with the lock turning mechanism of a deadbolt lock, and the lock turning mechanism of a doorknob lock.

2. A device for turning a doorknob, opening, closing, locking, and unlocking a door comprising:

a) an elongated handle having a first and a second end;

b) a generally-shaped rigid knob turning member, coated with a material having a high coefficient of friction at the first end of said elongated handle extending at approximately a 30 degree angle away from a longitudinal line extending through said elongated handle, having the shortest side of said j-shaped member having approximately a 30 degree angle from the parallel side of the shortest side of said member toward said longitudinal line, having additional bends that result in said longitudinal line to be generally centered with the face of the door knob when engaged with said knob;

c) a lock turning member at the second end of said elongated handle, with said lock turning member configured for engagement with the lock turning mechanism of a deadbolt lock, and the lock turning mechanism of a doorknob lock;

d) a strip of material across said j-shaped knob turning member.

* * * * *